United States Patent
Dooley

(10) Patent No.: US 7,530,260 B2
(45) Date of Patent: May 12, 2009

(54) SURGE DETECTION IN A GAS TURBINE ENGINE

(75) Inventor: Kevin Allan Dooley, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 109 days.

(21) Appl. No.: 11/737,160

(22) Filed: Apr. 19, 2007

(65) Prior Publication Data

US 2008/0260519 A1    Oct. 23, 2008

(51) Int. Cl.
G01M 15/14    (2006.01)

(52) U.S. Cl. .................................. 73/112.06

(58) Field of Classification Search ............. 73/112.01, 73/112.03, 112.05, 112.06, 114.38, 114.42, 73/114.43, 114.45, 114.48, 114.51
See application file for complete search history.

(56) References Cited

U.S. PATENT DOCUMENTS

| | | | |
|---|---|---|---|
| 3,344,602 A | 10/1967 | Davies et al. | |
| 4,206,595 A | 6/1980 | Cole | |
| 4,539,809 A | 9/1985 | Stanley et al. | |
| 4,622,808 A | 11/1986 | Kenison et al. | |
| 4,964,270 A | 10/1990 | Taylor et al. | |
| 5,095,694 A | 3/1992 | Shekleton et al. | |
| 5,277,023 A | 1/1994 | Bradley et al. | |
| 5,448,882 A * | 9/1995 | Dyer et al. | 60/39.281 |
| 5,528,897 A | 6/1996 | Halin | |
| 5,701,732 A | 12/1997 | Nesbitt et al. | |
| 5,726,891 A | 3/1998 | Sisson et al. | |
| 5,809,771 A | 9/1998 | Wernberg | |
| 5,896,737 A | 4/1999 | Dyer | |
| 5,927,067 A | 7/1999 | Hanloser et al. | |
| 5,966,926 A | 10/1999 | Shekleton et al. | |
| 6,195,978 B1 | 3/2001 | Futa, Jr. | |
| 6,314,998 B1 | 11/2001 | Futa, Jr. et al. | |
| 6,334,296 B2 | 1/2002 | Futa, Jr. et al. | |
| 6,385,962 B2 | 5/2002 | Futa, Jr. et al. | |
| 6,442,925 B1 | 9/2002 | Dalton et al. | |
| 6,536,217 B2 | 3/2003 | Lipinski et al. | |
| 6,619,025 B2 | 6/2003 | Wernberg | |
| 6,655,152 B2 | 12/2003 | Griffiths et al. | |
| 6,675,570 B2 | 1/2004 | Herbison et al. | |
| 6,675,583 B2 | 1/2004 | Willis et al. | |
| 6,751,939 B2 | 6/2004 | Futa, Jr. et al. | |
| 6,804,946 B2 | 10/2004 | Willis et al. | |
| 6,807,801 B2 | 10/2004 | McCarty | |
| 6,871,487 B2 | 3/2005 | Kurtz et al. | |
| 6,877,306 B2 | 4/2005 | Wernberg et al. | |
| 6,892,544 B2 | 5/2005 | Futa, Jr. et al. | |
| 7,065,973 B2 | 6/2006 | Rowe | |
| 7,386,981 B2 * | 6/2008 | Zielinski et al. | 60/772 |
| 2003/0106320 A1 * | 6/2003 | Ryan | 60/776 |
| 2005/0217235 A1 * | 10/2005 | Zielinski et al. | 60/39.281 |
| 2008/0016875 A1 * | 1/2008 | Ryan et al. | 60/776 |

FOREIGN PATENT DOCUMENTS

JP    58-057098    4/1983

OTHER PUBLICATIONS

U.S. Appl. No. 11/409,213, Dooley (Applicant's co-pending application).
U.S. Appl. No. 11/737,157, Dooley (Applicant's co-pending application).
International Search Report mailed on Jul. 24, 2008, on Applicant's corresponding PCT International Patent Application No. PCT/CA2008/000694.

* cited by examiner

*Primary Examiner*—Eric S McCall
(74) *Attorney, Agent, or Firm*—Ogilvy Renault LLP

(57) ABSTRACT

A method for detecting a surge condition during operation of a gas turbine engine includes detecting a change of pressure differential between fuel flows in a fuel system of the engine during engine operation.

18 Claims, 4 Drawing Sheets

SURGE DETECTION IN A GAS TURBINE ENGINE

TECHNICAL FIELD

The invention relates generally to gas turbine engines, and more particularly to an improved method and apparatus for detecting a surge condition during the operation of a gas turbine engine.

BACKGROUND OF THE ART

Under certain circumstances, if the flow through a gas turbine compressor separates over the airfoils sufficiently, the airfoil stalls, and the airfoil loses the ability to pump gas through the engine. The high pressure gas downstream, i.e. from the combustor and turbine sections of the engine, flows forward to the lower pressure stages of the engine. This "surge" lasts for 10-50 milliseconds. The surge condition may disappear and return some milliseconds later, creating a vibration which puts extreme load on the engine blades and shaft. This condition is not desirable and therefore various techniques have been developed for addressing surge in a gas turbine engine. To be able to address surge requires that surge conditions be detected.

Accordingly, there is a need to provide a method and apparatus for detecting a surge condition during the operation of gas turbine engines.

SUMMARY

In one aspect, provided is a method for detecting a surge condition during operation of a gas turbine engine which comprises (a) monitoring a pressure differential between a fuel flow to a pilot nozzle and a fuel flow to a main manifold of a combustor in a fuel system of the engine during engine operation; and (b) detecting an uncommanded momentary change of said pressure differential.

In another aspect, provided is an apparatus for detecting a surge condition during operation of a gas turbine engine which comprises a differential pressure transducer connected between first and second fuel passages of a fuel system, the first fuel passage leading to a pilot nozzle and the second fuel passage leading to a plurality of main nozzles, both the pilot nozzle and main nozzles being in fluid communication with a combustion chamber of the combustor; means for detecting an uncommanded momentary change of a pressure differential monitored by the differential pressure transducer during engine operation; and an indicator for indicating an occurrence of a surge condition in the gas turbine engine upon receipt of a signal relating to the detected uncommanded momentary pressure change.

In a further aspect, provided is a fuel system of a gas turbine engine which comprises a fuel pump for pressurizing fuel from a fuel source; at least one pilot nozzle in fluidic communication with a combustion chamber of the engine; a main manifold including a plurality of main nozzles in fluidic communication with the combustion chamber of the engine; a fluidic connection extending from the fuel pump and dividing into at least first and second passages leading to the respective pilot nozzle and main manifold; a differential pressure transducer between the first and second passages of the fluidic connection for monitoring a pressure differential between the first and second passages; a control unit in contact with the fluidic connection for controllably operating the fuel system, the control unit including a device for detecting an uncommanded momentary change of a pressure differential monitored by the differential pressure transducer; and an indicator for indicating an occurrence of a surge condition when the uncommanded momentary change of the pressure differential is detected.

Further details of these and other aspects will be apparent from the detailed description and figures included below.

DESCRIPTION OF THE DRAWINGS

Reference is now made to the accompanying figures in which.

DETAILED DESCRIPTION OF THE PREFERRED EMBODIMENTS

Figure 1:
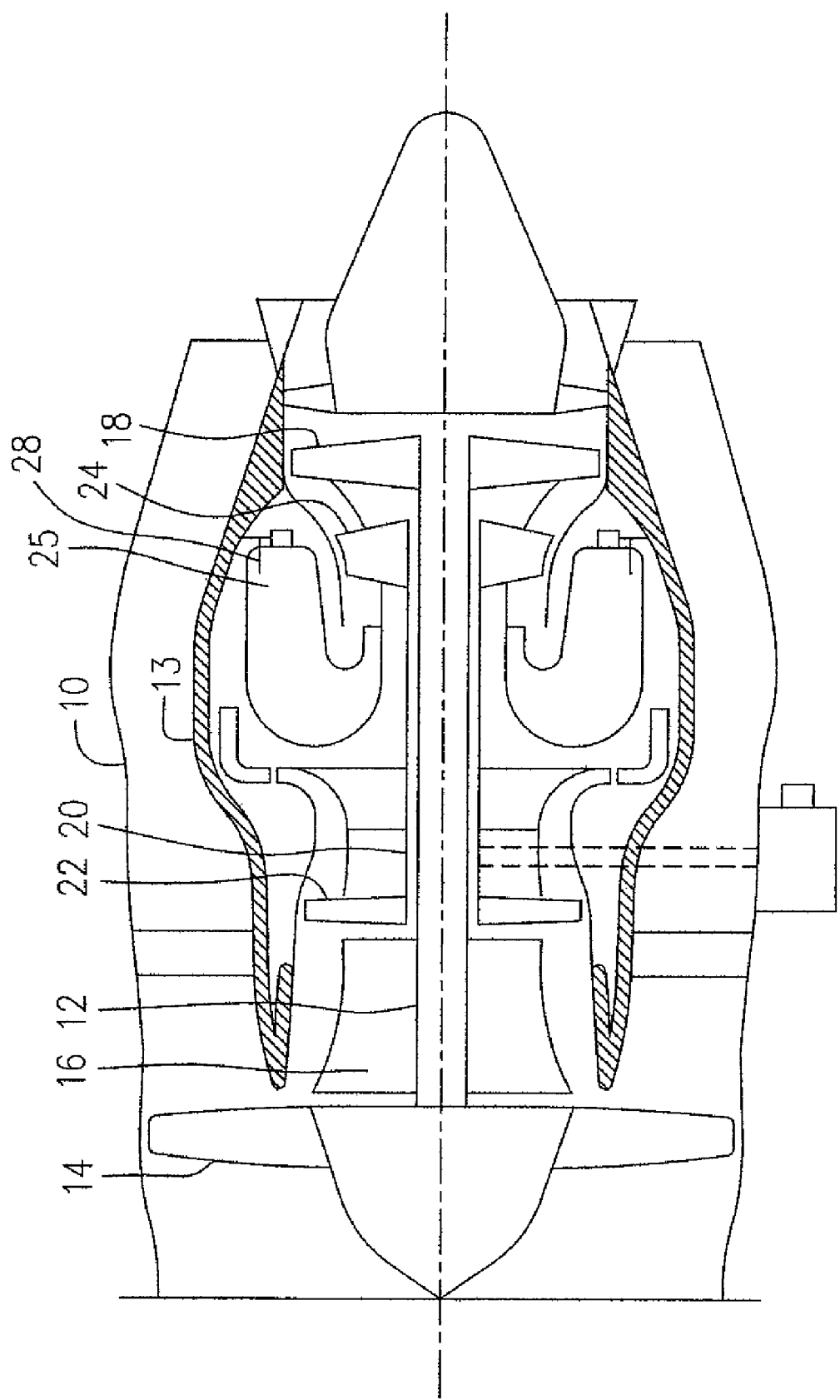
FIG. 1 is a schematic cross-sectional view of a turbofan gas turbine engine.

Referring to FIG. 1, a turbofan gas turbine engine includes a bypass duct 10, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The core casing 13 surrounds the low and high pressure spool assemblies 12 and 20 in order to define a main fluid path (not indicated) therethrough. In the main fluid path there are provided a combustor seen generally at 25 and a fuel system 28 for delivery of fuel to the combustor 25 for combustion via a manifold (not indicated) connected to a plurality of fuel nozzles (not depicted). The compressor assembly 22 provides a compressed airflow (not indicated) through the main fluid path and in communication with the combustor 25 for combustion therein.

Figure 2:
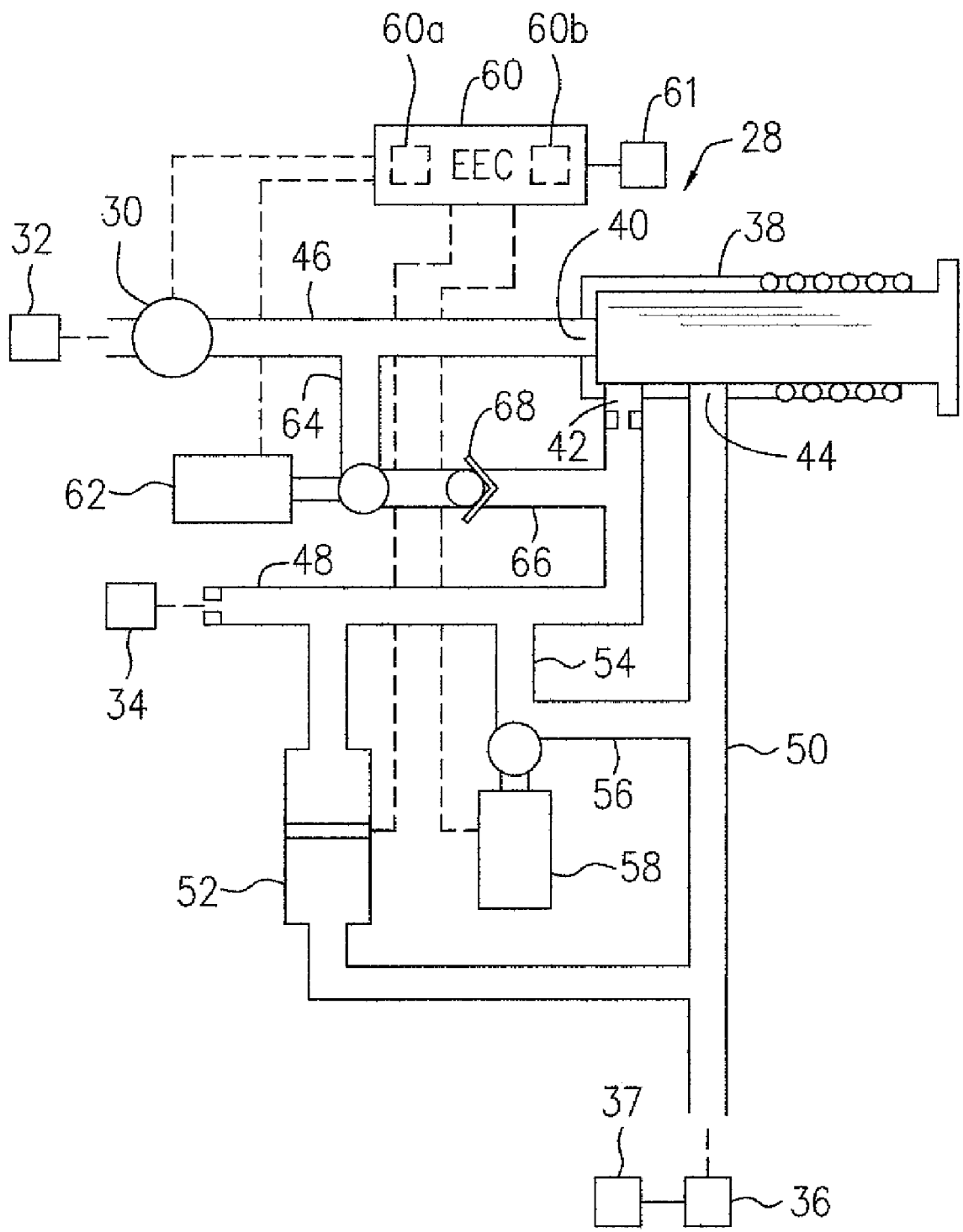
FIG. 2 is a schematic illustration of one embodiment of a fuel system used for the engine of FIG. 1.

Referring to FIGS. 1 and 2, the fuel system 28 according to one embodiment, comprises a fuel pump 30 (a vane type of fuel pump is preferred, which is driven independent of the high pressure spool) for pressurizing the fuel to establish a fuel pressure under which fuel is delivered from a fuel source 32 through a fluidic connection of the fuel system 28 preferably to at least one pilot nozzle 34 such as a torch nozzle or some other form of primary nozzle, which is used to initialize ignition of combustion in the combustor 25, and a main manifold 36 of the combustor 25 which distributes fuel to the main nozzles 37 of the combustor 25 in order to supply fuel for combustion within the combustor 25. The main nozzles 37 of the main manifold 36 are in fluid communication with the combustion chamber which in turn is in a fluidic communication with a stage of the compressor 22. The fluidic connection of the fuel system 28 further includes, for example, a minimum pressure/flow divider valve 38 having an inlet 40 and outlets 42, 44, which are normally closed under a spring force of the minimum pressure/flow divider valve 38. The minimum pressure/flow divider valve 38 is adapted to open the outlet 42 only when inlet 40 is exposed to a low pressure which is equal to or above a predetermined minimum pressure threshold, but is lower than a predetermined high pressure threshold, or to open both outlets 42 and 44 when inlet 40 is exposed to a high pressure, which is equal to or above the predetermined high pressure threshold. This will be further discussed with reference to the system operation process.

A fuel flow passage 46 interconnects the fuel pump 30 and the inlet 40 of the minimum pressure/flow divider valve 38, and a fuel flow passage 48 is connected between the outlet 42 and the pilot nozzle 34. There is a fuel flow passage 50 extending between the outlet 44 of the minimum pressure/flow divider valve 38 and the main manifold 36 in a parallel relationship with the fuel flow passage 48. It should be noted that due to the flow rate difference between the required fuel flow to the pilot nozzle 34 (the igniter flow) and the fuel flow to the main nozzles 37 of the main manifold 36 (the manifold flow), the fuel flow passage 48 is sized in cross-section smaller than the fuel flow passage 50, and the orifice (not shown) of the pilot nozzle 34 is also small with respect to the main nozzles 37 of the main manifold, thereby resulting in a high flow resistance of the fuel flow passage 48 relative to the fuel flow passage 50.

A differential pressure transducer 52 is preferably connected between the fuel flow passage 48 and the fuel flow passage 50 such that a pressure differential between fuel flow passages 48 and 50 can be monitored from time to time. The differential pressure transducer 52 is electrically connected to an electrical engine control (EEC) 60 such that the pressure differential between the fuel flow passages 48 and 50 monitored by the differential pressure transducer 52, can be used by EEC 60 as a reference signal for controlling the operation process of the fuel system 28.

In practice, metering the start fuel flow using only the fuel pump characteristics is not very practical. However, when the pressure differential between the pilot nozzle fuel supply and the main manifold (which is in communication with the combustor chamber pressure) is measured, the fuel flow to the pilot nozzle can be calculated and thus controlled by adjusting the speed of the fuel pump via the EEC.

A flow equalization solenoid valve 58 is preferably connected by fuel flow passages 54, 56 to the respective fuel flow passages 48 and 50, in a parallel relationship with the differential pressure transducer 52. The flow equalization solenoid valve 58 is a normally open valve to allow a fluidic communication between the fuel flow passages 48 and 50 when the minimum pressure/flow divider valve 38 closes outlets 42 and 44 thereof. The flow equalization solenoid valve 58 is electrically connected to and controlled by EEC 60 and is adapted to close the fuel flow passages 54, 56 when a control signal is received from the EEC 60.

The differential pressure transducer 52 is in fluidic connection with the respective pilot nozzle 34 and the main nozzles 37 of the main manifold 36 which are in turn in fluid communication with the combustion chamber, which is supplied with air pressure from the compressor, for example, P3 compressor air. However, the air pressure measured in the combustion chamber of the combustor 25 may be slightly lower than P3, and therefore may be named as P4 combustion chamber air pressure. Therefore, the P4 combustion chamber air pressure is automatically provided to the differential pressure transducer 52 as a reference pressure via fuel flow passage 50, when the flow equalization solenoid valve 58 is in the closed position and outlet 44 of the minimum pressure/flow divider valve 38 is closed (when the compressor 22 is rotated either by the turbine 24 or by a starter) for monitoring the pressure differential between the fuel flow passages 48 and 50. For example, the pressure differential between the fuel flow passages 48 and 50 monitored by the differential pressure transducer 52, can be used for monitoring a fuel flow through the fuel flow passage 48 to the pilot nozzle 34 during the engine start-up process, and to determine when to deactivate the flow equalization solenoid valve 58 to open the fuel flow passages 54, 56 in order to allow the fuel flow to pass through the fuel flow passage 50 to the main manifold 36. This will be further described hereinafter.

An ecology solenoid valve 62 is preferably provided to control fuel flow passages 64, 66 which are connected to the respective fuel flow passages 46 and 48 to form a bypass over the minimum pressure/flow divider valve 38. The ecology solenoid valve 62 is normally closed and is electrically connected to EEC 60. The ecology solenoid valve 62 can be controlled by EEC 60 to selectively open for establishing the fluidic connection of the fuel system 28 between the fuel source 32 and the main nozzles 37 of the main manifold 36, as well as the pilot nozzle 34 when required.

A check valve 68 is preferably provided within the fuel flow passage 66. Should the ecology valve 62 be opened in malfunction, the check valve 68 ensures that the bypass connection over the minimum pressure/flow divider valve 38 should be used only for fuel flowing therethrough back to the fuel pump 30 and the fuel source 32, but not for fuel supply therethrough from the fuel pump 30.

Figure 3:
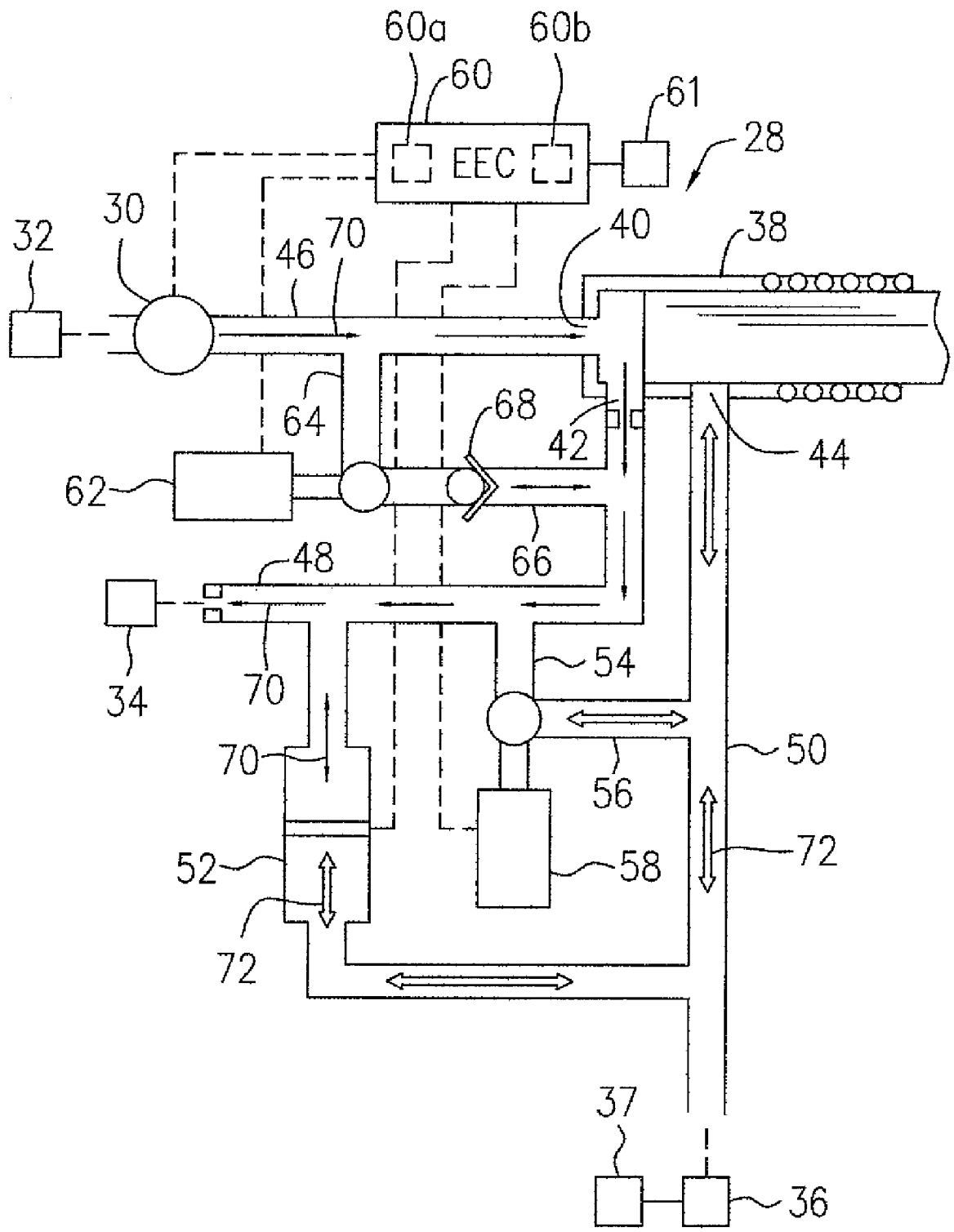
FIG. 3 is a schematic illustration of the fuel system of FIG. 2, showing a step of the fuel system operation for supplying a fuel flow to a pilot nozzle while a main manifold is in a dry condition, in an engine start procedure.
Figure 4:
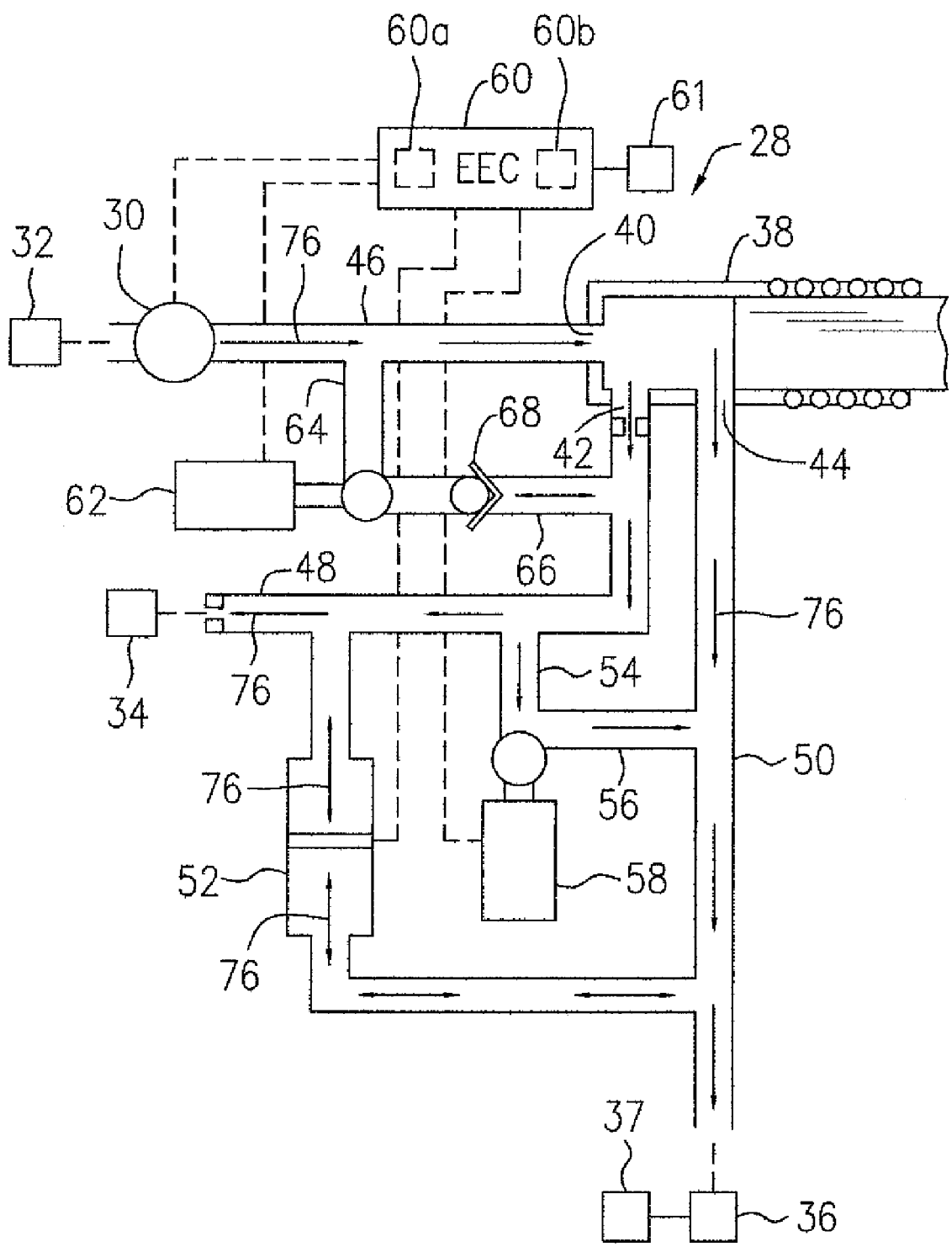
FIG. 4 is a schematic illustration of the fuel system of FIG. 2, showing a further step of the fuel system operation for supplying both the pilot flow and main manifold flow under a high fuel pressure to the respective pilot nozzle and the main manifold for combustion in the combustor

FIGS. 3-4 illustrate the steps of operation of the fuel system 28. For convenience of description, different numerals in those Figures are used in connection with arrows to indicate fluid flows under pressure differentials having different values. A single head arrow indicates the direction of the fluid flow and a double head arrow indicates the fluid flow is blocked.

Referring to FIG. 3, EEC 60 controls the fuel pump 30 to operate at a speed to establish the low fuel pressure during engine start conditions. The low fuel pressure forces the minimum pressure/flow divider valve 38 to open the inlet 40 and outlet 42, allowing a fuel flow indicated by arrow 70 to pass through the fuel passages 46, 48 to the pilot nozzle 34. The ecology solenoid valve 62 is normally closed such that there is no fuel flow through the bypass formed by the fuel flow passages 64, 66. The flow equalization solenoid valve 58 is activated by EEC 60 to be closed during the initial engine start condition such that there is no fuel flow passing through fuel flow passage 50 to the main manifold, either via the minimum pressure/flow divider valve 38 or via the fuel flow passages 54, 56. The fuel flow passage 50 and the main manifold 36 may either remain in a dry condition (or be pre-filled with fuel), having a pressure therein equal to the air pressure in the combustor 25 of FIG. 1. The air (or the pre-filled fuel) inside of the fuel flow passage 50 and the main manifold 36 under such air pressure, is indicated by the hollow double-head arrows 72. The low fuel pressure in the fuel flow passages 46, 48 is higher than the pressure in the fuel flow passage 50, thereby forming a pressure differential therebetween. The pressure differential is monitored by the differential pressure transducer 52 which sends corresponding signals to EEC 60.

It should be noted that a relatively low range (i.e. sensitive) pressure transducer is preferred for the purpose of monitoring flow during start and fuel pulses on manifold filling. It is preferable to use a sensitive or low range pressure transducer in practical terms, because the transducer never has a high pressure differential applied to it. The differential pressure is shunted out via fuel passages 54 and 56 in conjunction with flow equalization valve 58, limiting the maximum differential pressure to which the transducer is exposed. For example, the differential pressure during start is of the order of 120 PSI maximum, however the fuel system pressure may be over 1000 PSI during take off conditions. A transducer used for applications involving 1000 PSI is less precise at resolving small pressure differentials needed to control flow at low flow conditions. Therefore, it is optional to have a transducer having a maximum pressure indication for example, not greater than 150 PSI.

In FIG. 4, during the engine start-up the fuel flow from the pilot nozzle 34 is ignited or lit up, and upon which EEC 60 commands the fuel pump to increase the pump drive to establish a higher fuel pressure in order to force the minimum pressure/flow divider valve 38 to open both outlets 42 and 44 which results in a gradual and controlled increase in the fuel flow, as the compressor speed increases. Meanwhile, EEC 60 commands the flow equalization solenoid valve 58 to open the fuel flow passages 54, 56, thereby allowing fuel flow via both outlets 42, 44 through the fuel flow passage 50 to the main manifold 36 for establishing a properly distributed fuel flow between all nozzles and a stable combustion process in the combustor 25 of FIG. 1. At the same time, fuel flow 76 moves via outlet 42 of the minimum pressure/flow divider valve 38 through the fuel flow passage 48 to the pilot nozzle 34 to maintain the pilot flame. This process begins upon light-up of the pilot nozzle 34 during the engine start-up procedure and will be maintained during engine operation for a stable combustion in the engine combustor 25.

The check valve 68 in fuel flow passage 66 does not allow fuel flow from the fuel pump 30 to pass the bypass formed by the fuel flow passages 64, 66, to the fuel flow passage 48. EEC 60 also commands the ecology solenoid valve 62 to close the bypass. Therefore, during engine start-up and the entire engine operation process, fuel is supplied from the fuel source 32 to the respective pilot nozzle 34 and the main nozzles 37 of the main manifold 36 through the fluidic connection of the fuel system 28 via the minimum pressure/flow divider valve 38, but not via the closed bypass of fuel flow passages 64, 66.

During normal operation, the minimum pressure/flow divider valve 38 opens both outlets 42 and 44 and the flow equalization solenoid valve 58 opens the fuel flow passages 54, 56, and therefore the fuel flow pressures in fuel flow passage 48 and in fuel flow passage 50 are substantially equal. The pressure differential monitored by the differential pressure transducer 52 is substantially zero.

It is understood that when a surge condition occurs during engine operation, P3 compressor air pressure, and therefore P4 combustion chamber air pressure, will significantly and momentarily decrease before returning to pre-decrease levels. This momentary pressure drop is uncommanded and occurs for only a fraction of a second. This P3 (and thus P4) pressure drop will also cause fuel pressure drops in both the pilot nozzle 34 and the main nozzles 37 of the main manifold 36, because both the pilot nozzle 34 and the main nozzles 37 of the main manifold 36 are in fluid communication with the P4 air in the combustion chamber, and therefore also the P3 air of the compressor. Therefore, during an instantaneous compressor surge condition, the instantaneous fuel pressures in both fuel flow passage 48 and fuel flow passage 50 also drop momentarily, as the P4 combustion chamber pressure momentarily drops. Due to the difference between the flow resistance in fuel flow passage 50 with main manifold 36 (which resistance is relatively small) and the flow resistance in the fuel flow passage 48 with pilot nozzle 34 (which resistance is relatively larger), the fuel pressure in fuel flow passage 50 tends to drop faster than the fuel pressure in fuel flow passage 48, thereby creating a momentary change in the pressure differential (i.e. which will also appear as an apparent momentary rise of the pressure in fuel flow passage 48 relative to fuel flow passage 50) monitored by the differential pressure transducer 52. Because this uncommanded pressure drop during a surge condition occurs within a very short period of time, the momentary change of the pressure differential monitored by the differential pressure transducer 52 will likely be significant. The differential pressure transducer 52 will "see" the difference in instantaneous pressure drops as a pressure differential increase of the fuel flow in fuel flow passage 48 over the fuel flow in fuel flow passage 50. This momentary rise of the pressure differential may be used as a signal for detection of a surge condition in engine operation.

The momentary change in fuel flow pressure differential which is caused by a surge condition may be distinguished from other pressure changes "seen" by the differential pressure transducer 52 because a change caused by a surge condition is not a result of a commanded manipulation in engine control. Therefore, for example, a logic component 60a included in the EEC 60 may be used to identify whether a received signal indicating an occurrence of a momentary pressure differential change is the result of an uncommanded or commanded change, for example by examining whether the change corresponds to a change in pilot throttle setting, by determining a transient length of such change, and so on. When this signal is identified as being uncommanded, EEC 60 causes an indicator 61 to indicate the occurrence of a surge condition. EEC 60 may also include a device 60b for detecting/capturing data regarding the momentary changes of a pressure differential monitored by the differential pressure transducer 52. The device 60b may also include, for example, a memory for recording the data regarding detected changes, such a magnitude, duration, etc. It should also be noted that in contrast to the uncommanded momentary change of air pressures (P3 and P4) (and thus fuel pressures in the fuel system 28) during a surge, the rates of change such as in air pressures P3, P4 and fuel pressures in the fuel system 28 caused by commanded manipulation such as acceleration or deceleration of engine speed, is a relatively low value. This means, the magnitude of the change of the pressure differential which is caused by any commanded manipulation, as monitored by the differential pressure transducer 52, will be significantly less than a detected one caused by a surge condition because of the relative time constants of the pilot nozzle 34 with the fuel passage 48 and the main manifold 36 with the fuel passage 50; Therefore, the detected changes of pressure differential from the differential pressure transducer 52 may also be identified by the logic component 60a in EEC 60 by comparing the significance of the magnitudes of the detected changes. Still other suitable manners of discerning commanded from uncommanded changes are available, and not all possibilities can be discussed here.

The above description is meant to be exemplary only, and one skilled in the art will recognize that changes may be made to the embodiments described without departure from the scope of the invention disclosed. For example, the present approach can be applied to various types of gas turbine engines other than a turbofan gas turbine engine which is used as an example to illustrate one possible application. A fuel system may include more or less components therein for various types of gas turbine engines without departing from the spirit of the present approach, and may include but not be limited to fuel reheating devices, fuel metering devices, etc. Still other modifications which fall within the scope of the invention disclosed will be apparent to those skilled in the art, in light of a review of this disclosure, and such modifications are intended to fall within the appended claims.

The invention claimed is:

1. A method for detecting a surge condition during operation of a gas turbine engine, comprising:

a) monitoring a pressure differential between a fuel flow to a pilot nozzle and a fuel flow to a main manifold of a combustor in a fuel system of the engine during engine operation; and b) detecting an uncommanded momentary change of said pressure differential.

2. The method as defined in claim 1 comprising a step of indicating a surge condition in the engine operation when the uncommanded momentary change of the pressure differential is verified.

3. The method as defined in claim 1 wherein the uncommanded momentary change is a momentary increase of the fuel pressure of the fuel flow to the pilot nozzle over the fuel pressure of the fuel flow to the main manifold.

4. The method as defined in claim 1 wherein the steps (a) and (b) are conducted when the pilot nozzle and the main manifold are in direct fluid communication in the fuel system.

5. The method as defined in claim 1 wherein step (b) is practised by steps:

b1) detecting a momentary change of the monitored pressure differential; and b2) identifying the detected momentary change of the monitored pressure differential as being uncommanded during engine operation.

6. The method as defined in claim 5 wherein the detected momentary increase of the pressure differential is recorded in a memory.

7. The method as defined in claim 5 further comprising indicating an occurrence of a surge condition in the engine when the uncommanded momentary increase of the pressure differential is identified.

8. An apparatus for detecting a surge condition during operation of a gas turbine engine comprising:

a differential pressure transducer connected between first and second fuel passages of a fuel system, the first fuel passage leading to a pilot nozzle and the second fuel passage leading to a plurality of main nozzles, both the pilot nozzle and main nozzles being in fluid communication with a combustion chamber of the combustor;

means for detecting an uncommanded momentary change of a pressure differential monitored by the differential pressure transducer during engine operation; and an indicator for indicating an occurrence of a surge condition in the gas turbine engine upon receipt of a signal relating to the detected uncommanded momentary pressure change.

9. The apparatus as defined in claim 8 wherein the differential pressure transducer has a maximum pressure indication smaller than 150 PSI.

10. The apparatus as defined in claim 8 wherein the means comprise a device for detecting a momentary change of the pressure differential monitored by the differential pressure transducer and a device for identifying the detected momentary change of the monitored pressure differential as being uncommanded.

11. The apparatus as defined in claim 10 wherein the means comprise a memory for recording the detected momentary change.

12. The apparatus as defined in claim 10 wherein the differential pressure transducer has a maximum pressure indication smaller than a maximum fuel pressure in the system established by the fuel pump.

13. A fuel system of a gas turbine engine, comprising:

a fuel pump for pressurizing fuel from a fuel source;

at least one pilot nozzle in fluidic communication with a combustion chamber of the engine;

a main manifold including a plurality of main nozzles in fluidic communication with the combustion chamber of the engine;

a fluidic connection extending from the fuel pump and dividing into at least first and second passages leading to the respective pilot nozzle and main manifold;

a differential pressure transducer between the first and second passages of the fluidic connection for monitoring a pressure differential between the first and second passages;

a control unit in contact with the fluidic connection for controllably operating the fuel system, the control unit including a device for detecting an uncommanded momentary change of a pressure differential monitored by the differential pressure transducer; and an indicator for indicating an occurrence of a surge condition when the uncommanded momentary change of the pressure differential is detected.

14. The system as defined in claim 13 further comprising a pressure valve adapted (1) to prevent fuel from flowing through the fluidic connection to the respective pilot nozzle and main manifold when a fuel pressure created by the fuel pump varies to become lower than a first value; (2) to allow fuel to flow only through the first passage to the pilot nozzle when the fuel pressure varies to become higher than the first value and lower than a second value; and (3) to allow fuel to flow through both the first and second passages to the respective pilot nozzle and main manifold when the fuel pressure varies to become higher than the second value.

15. The system as defined in claim 14 further comprising a first on-and-off valve associated with a bypass passage over the pressure valve, to selectively open and close the bypass passage.

16. The system as defined in claim 15 further comprising a cheek valve in the bypass passage.

17. The system as defined in claim 15 further comprising a second on-and-off valve between the first and second passages of the fluidic connection, in a parallel relationship with the differential pressure transducer, for selectively opening and closing a direct fluid communication between the first and second passages.

18. The system as defined in claim 15 wherein the first and second on-and-off valves are controlled by the control unit.

* * * * *